No. 809,046. PATENTED JAN. 2, 1906.
W. A. COLLINS.
SPRINKLING MACHINE.
APPLICATION FILED MAY 13, 1905.
2 SHEETS—SHEET 1.
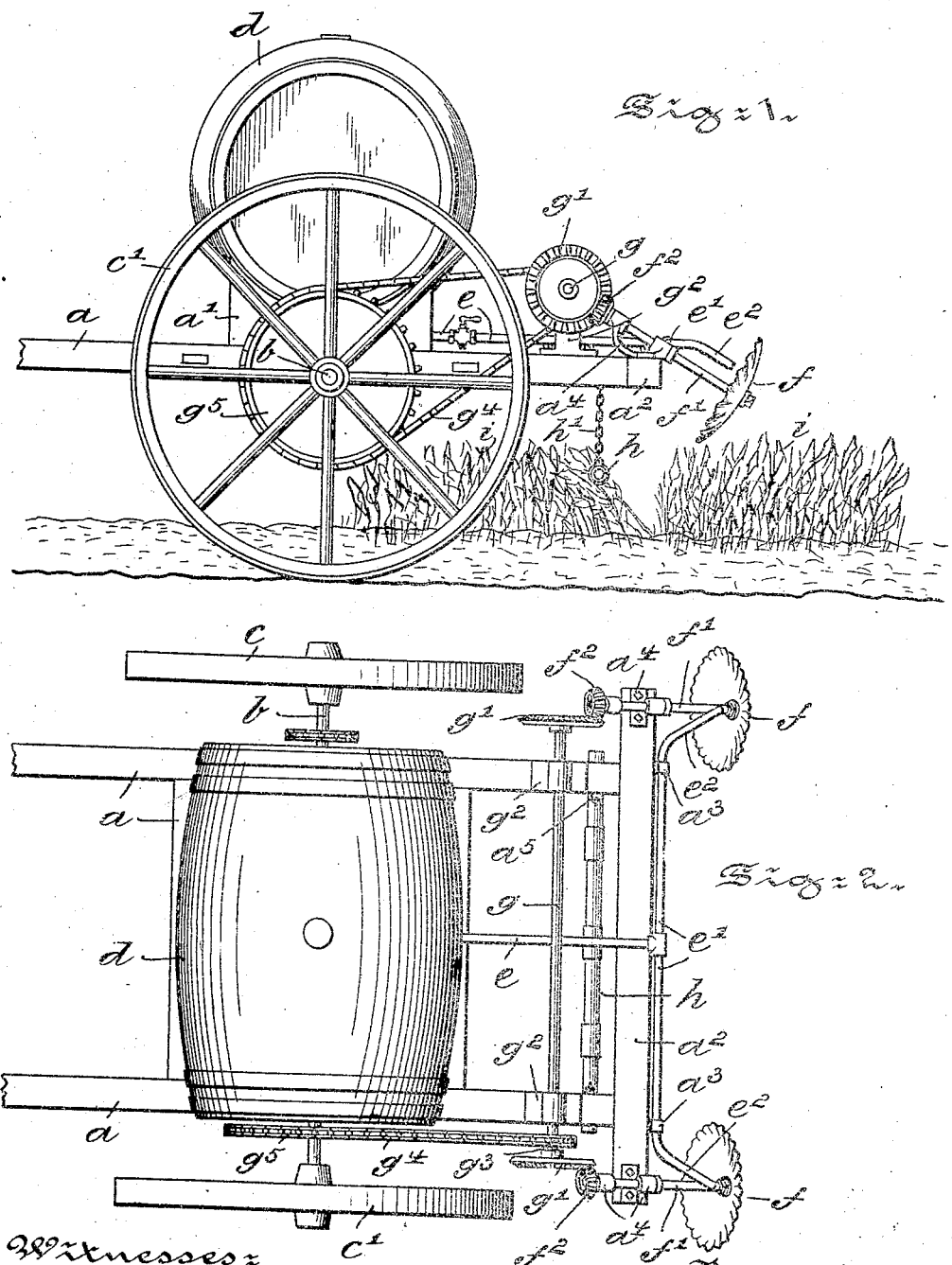

No. 809,046. PATENTED JAN. 2, 1906.
W. A. COLLINS.
SPRINKLING MACHINE.
APPLICATION FILED MAY 13, 1905.
2 SHEETS—SHEET 2.
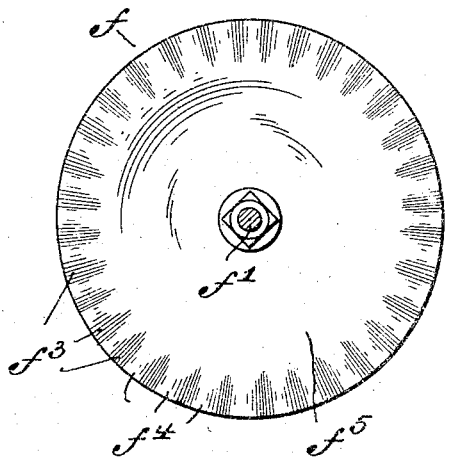
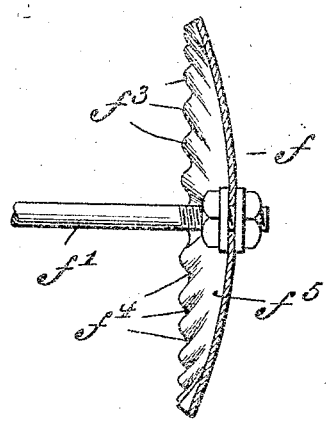
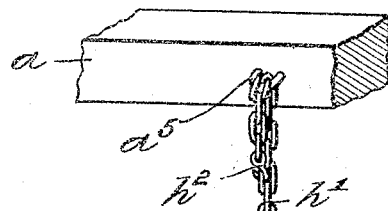
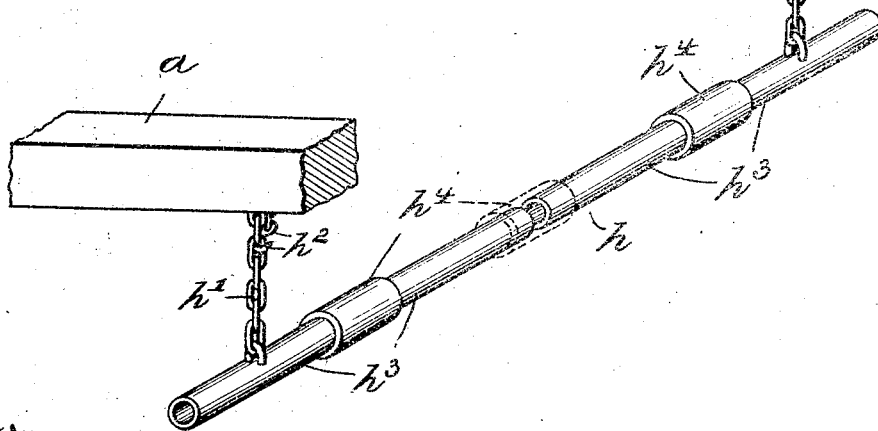

UNITED STATES PATENT OFFICE.

WALTER A. COLLINS, OF PENNS MANOR, PENNSYLVANIA.

SPRINKLING-MACHINE.

No. 809,046.	Specification of Letters Patent.	Patented Jan. 2, 1906.

Application filed May 13, 1905. Serial No. 260,215.

*To all whom it may concern:*

Be it known that I, WALTER A. COLLINS, a citizen of the United States, residing at Penns Manor, in the county of Bucks and State of Pennsylvania, have invented certain new and useful Improvements in Sprinkling-Machines, of which the following is a specification.

My invention has relation to a sprinkling-machine, and in such connection it relates more particularly to means for permitting of the elevating or raising of vines anterior to the sprinkling of the same with an insect-destroying fluid and to the arrangement of the sprayer coöperating with said means for the accomplishment of the said results.

The principal objects of my invention are, first, to provide a sprinkling-machine with a spraying device adapted to spray an insect-destroying fluid in oblique downward and upward directions, so as to reach the stems as well as under and upper sides or surfaces of the leaves of the vines; second, to provide such a machine with means adapted to contact with and to raise the vines in the path of the spraying device, so as to permit of the same spraying the under side or surface of the leaves and when the vines have returned to their initial positions to permit the spray, consisting of an insect-destroying fluid, to come in contact with the upper side or surface of the leaves, and, third, to so arrange the spraying device that the fluid is thrown with a force against the vines by contacting with corrugations provided about the periphery of the spraying device.

The nature, scope, and characteristic features of my invention will be more fully understood from the following description, taken in connection with the accompanying drawings, forming part hereof, in which—

Figure 1 is a side elevational view illustrating a spraying device occupying an oblique position with respect to its supporting-frame and of means suspended from the frame of the sprinkling-machine adapted to raise vines anterior to the sprinkling of the same with an insect-destroying fluid embodying main features of my present invention. Fig. 2 is a top or plan view of the sprinkling-machine of Fig. 1. Fig. 3 is a detail view, enlarged, illustrating in side elevation the spraying device. Fig. 4 is a view, partly in section and partly in elevation, illustrating the disk-shaped and curved spraying device and its supporting and actuating means; and Fig. 5 is a detail view, enlarged, illustrating in a perspective view a flexible bar, a portion of the supporting-frame for the same, and the manner of adjustably connecting the bar with the frame.

Referring to the drawings, $a$ is the frame of the machine, which is carried by an axle $b$, supported by wheels $c$ and $c'$. Preferably central to the axle $b$ and supported by standards $a'$, resting on the frame $a$, is arranged a receptacle $d$, adapted to receive an insect-destroying or other fluid. From this receptacle $d$ the fluid by means of a pipe $e$ is conducted to a transverse pipe $e'$, terminating with its bent ends $e^2$ adjacent to a spraying device $f$. The pipe $e'$ is held in operative position by a bar $a^2$ of the frame $a$, to which the same is preferably connected by means of brackets $a^3$. Supported by brackets $a^4$, secured to the ends of the bar $a^2$ and held by the same in an oblique position with respect to the frame $a$ are arranged two shafts $f'$, each supporting at its lower end a spraying device $f$. Each of the shafts $f'$ is provided with a bevel-gear $f^2$, meshing with bevel-gears $g'$ of a shaft $g$, which by means of standards $g^2$, is secured to the framework $a$. The shaft $g$ is connected with the axle $b$ through the intervention of a sprocket-wheel $g^3$, secured to the shaft $g$, a chain $g^4$, and a sprocket-wheel $g^5$, secured to the axle $b$, and which axle when rotated by the shifting of the frame $a$ transmits its rotary movement to the shaft $g$ and by the same to the spraying device $f$. Below the frame $a$ and a certain distance in front of the spraying device $f$ is arranged a bar $h$, which, preferably by chains $h'$, is connected with the frame $a$. One mode of adjustably securing the chains $h$ to the frame $a$ is to pass the same through staples $a^5$ thereof and to bring the hook $h^2$ of the chains into engagement with one of the links of the chains, as shown in Fig. 5. By this arrangement the bar $h$ may be readily raised and lowered with respect to the frame $a$, so that the bar may properly engage and raise and bend over the vines $i$ of various heights in the manner, for example, as shown in Fig. 1. By the forward movement of the machine the bar $h$ is brought successively into engagement with the vines $i$ and by abutting against the same will elevate or raise the lower obliquely-growing branches and bend over the straight-growing branches of the vines and bring the under side or surface of the leaves thereof into a position in which the same may be readily reached and covered by the fluid in spray form thrown against the vines by the spraying device $f$. Each of the spraying devices $f$, as shown in Figs. 1, 2, 3, and 4, consists of a disk preferably concaved or dish-shaped. This disk adjacent to its perimeter is corrugated, forming alternately projections $f^3$ and depressions $f^4$. The fluid issuing from the bent ends $e^2$ of the pipe $e'$ is brought into engagement with the inner smooth side or surface $f^5$ of the device $f$ and by its rapid rotation is spread out over the disk and brought into engagement with the corrugations in the perimeter thereof. The projections $f^3$ are adapted to throw the fluid radially over a great area and with sufficient force against the vines so that the striking fluid particles will readily spread over the leaves. The concaved inner surface of the sprayers $f$ imparts to the fluid passing over the same a certain forward movement which counteracts the deflection of the spray by gravity. The bar $h$, having raised and bent over the vines in front of the sprayers $f$, permits the same to thoroughly spray the under side or surface of the leaves thereof as the machine is moved over or about the vines, and the vines in front of the bar $h$ receive the fluid on top of the leaves, so that both the under and upper sides or surfaces, as well as stems of the vines, are thoroughly sprayed with fluid in a mist-like form. In this manner all insects will be effectually destroyed by the fluid, since the same will be spread over every portion of the vines or plants. In order to enable the bar $h$ to clear and to disengage itself from obstructions when brought into engagement therewith, the same consists, preferably, of solid sections $h^3$, which are connected with each other by flexible sections $h^4$. The sections $h^3$ and $h^4$ (shown in Fig. 5) consist of pipe-sections coupled by rubber-hose sections; but other arrangements of the foregoing device for the said purpose may be employed and still be within the spirit and scope of my said invention.

Having thus described the nature and objects of my invention, what I claim as new, and desire to secure by Letters Patent, is—

1. In a sprinkling-machine, a frame adapted to be held in a substantially horizontal position, a disk-shape concaved sprayer carried by said frame and adapted to be held by the same in an oblique position, and said sprayer adapted when rotated to throw a fluid conducted to the same radially backward toward said frame and in an oblique direction with respect thereto.

2. In a sprinkling-machine, a frame adapted to be held in a substantially horizontal position, concaved sprayers arranged at the rear end of said frame and adapted to be held by the same in an oblique position with respect thereto, means suspended from said frame and held by the same a certain distance in front and parallel to said sprayers and the rear end of said frame, said means adapted to engage and to raise and to bend over vines when brought into engagement therewith to permit liquid conducted to said sprayers to be spread by the same backward toward said vine-actuating means and in an oblique direction thereto and over and about the leaves of said vines and to prevent deflection of said fluid by gravity.

3. In a sprinkling-machine, a frame adapted to be held in a substantially horizontal position, concaved sprayers arranged at the rear end of said frame and adapted to be held by the same in an oblique position with respect to said frame, means yielding in vertical and horizontal planes suspended from said frame and held by the same a certain distance in front and parallel to said sprayers and to the rear end of said frame, said means adapted to be brought into and out of engagement with vines, and said concaved sprayers adapted when the vines are raised and bent over by said means to spray a fluid radially toward and about the under and upper sides or surface of the leaves of said vines and to prevent deflection of certain portions of said fluid by gravity.

4. In a sprinkling-machine, a sprayer consisting of a concaved disk having a central smooth portion and a corrugated portion forming projections and depressions radially extending from the smooth portion surrounding the same and terminating about the perimeter of said disk, said smooth portion, when said disk is rotated, adapted to permit of the spreading of a fluid over the same and the projections of said corrugated portion in conjunction with said smooth portion adapted to throw or cast the fluid radially from said disk and to deflect the same backward and means for positively rotating said disk.

5. In a sprinkling-machine, a frame adapted to be held in a substantially horizontal position, concaved sprayers having central smooth and corrugated outer portions forming projections and depressions arranged at the rear end of said frame and adapted to be held in an oblique position in respect thereto, a bar yielding in vertical and horizontal planes arranged below said frame a certain distance in front and parallel to said sprayers and adapted to be brought into and out of engagement with vines, said sprayers adapted to radiate fluid in an oblique direction and to throw the same slightly forward by passing over the concaved surface thereof to reach the under side or surface of the leaves of said vines and to counteract deflection of a certain portion of the fluid-spray by gravity.

6. In a sprinkling-machine, a frame adapted to be held in a substantially horizontal position, a sprayer carried by said frame and adapted to be held by the same in a substantially oblique position with respect thereto, a bar consisting of rigid and yielding members, flexible means adapted to adjustably connect said bar with said frame so as to be held by the same a certain distance in front of said sprayer, said bar adapted to raise and bend over vines when brought into engagement therewith so as to expose the under side or surfaces of the leaves thereof, and said sprayer adapted when rotated to throw a fluid over the leaves of said vines.

In testimony whereof I have hereunto set my signature in the presence of two subscribing witnesses.

WALTER A. COLLINS.

Witnesses:
 HEADLEY WOOLSTON,
 JOE V. GOWEN.